March 14, 1950     F. A. MAXWELL     2,500,558
TAPER MEASURING DEVICE
Filed Jan. 30, 1947
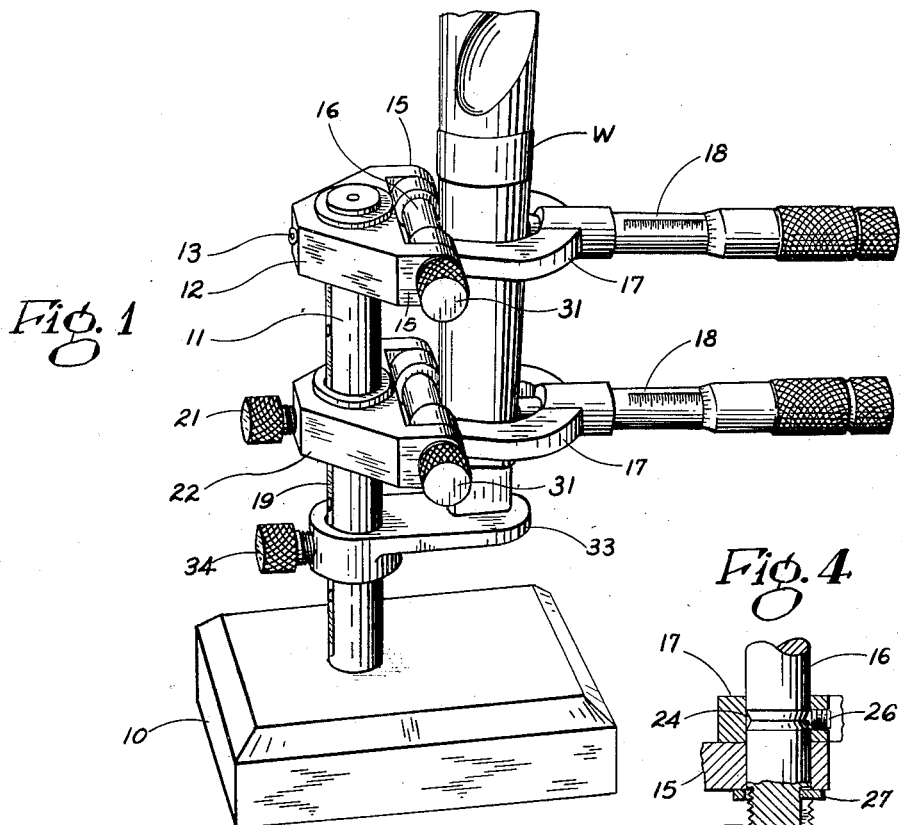
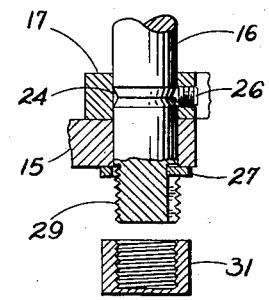
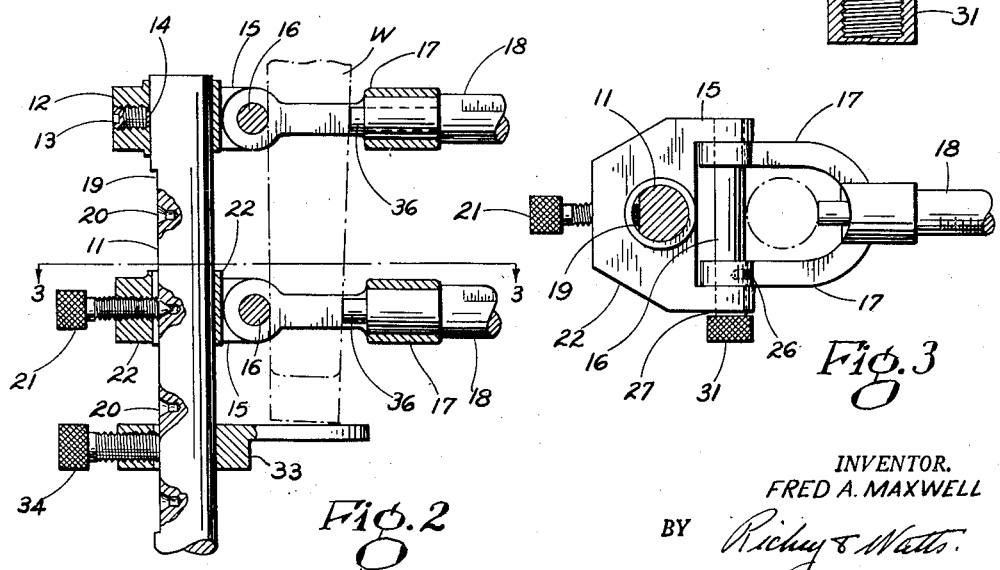
INVENTOR.
FRED A. MAXWELL
BY *Richey & Watts*
ATTORNEYS Patented Mar. 14, 1950

2,500,558

UNITED STATES PATENT OFFICE 2,500,558

TAPER MEASURING DEVICE

Fred A. Maxwell, Bedford, Ohio, assignor to Jack Erwin Maxwell, Bedford, Ohio

Application January 30, 1947, Serial No. 725,405

19 Claims. (Cl. 33—174)

This invention relates to instruments for measuring tapered bodies such as drill shanks, gibs and similar tools or machine parts.

One of the objects of the invention is to provide an instrument for taking diametric measurements with micrometric accuracy at two longitudinally spaced points on the tapered portion of a tool, gauge, or work piece.

Another object of the invention is to provide an instrument which is designed to facilitate the support of a tool or work piece in such a manner as to assure accuracy of adjustment of the micrometers before the readings thereof are noted.

Another object of the invention is to provide a work engaging pin which may be rotated to present a new surface when wear occurs.

Another object of the invention is to provide an instrument which may be used as a bench gauge or altered for use in checking the taper of a work piece while held in place in a machine tool.

Further objects and advantages of the invention reside in the provision of an instrument which is sturdy of structure, efficient of operation, and adapted to facilitate measuring operations with precision and dispatch.

Other objects more or less ancillary to the foregoing and the manner in which all of the various objects are realized will appear in the following description, which, considered in connection with the accompanying drawings, sets forth the preferred embodiment of the invention.

Referring to the drawings:

Fig. 1 is a view in perspective of the improved instrument illustrating the manner in which a drill shank is supported during the measuring operation;

Fig. 2 is a vertical section through the post or stanchion of the instrument and a fragmentary portion of the two micrometer heads;

Fig. 3 is a transverse section through the instrument, the section being taken on a plane indicated by the line 3—3 in Fig. 2; and Fig. 4 is a partial sectional view taken through the axis of one of the pins illustrating details of construction.

As illustrated in Fig. 1, the instrument is preferably mounted on a base 10 when used for bench inspection; and the post or stanchion 11 may be formed with a lower end portion of reduced diameter which fits into a bore in the base, so that the operative portion of the instrument may be lifted from the base when it is desired to measure a tapered portion of work supported in a lathe, milling machine, or other machine tool. The post 11 is provided with a bracket 12 which is fixed to the cylindrical upper portion of the post by a screw 13 which is engaged with a soft metal plug 14 to prevent mutilation of the post. The bracket 12 is formed with parallel ears 15 which are cross-bored for the reception of a pin 16 constituting the supporting member for a yoke 17 bored to retain the barrel of the micrometer head 18. The micrometer may be frictionally engaged in the bored opening in the yoke or affixed therein in any other suitable manner. The post 11 is milled throughout the major portion of its length with a flat area 19 having drilled and countersunk equally spaced chamfered detent openings 20 for the reception of a pointed thumb screw 21 mounted in a bracket 22 similar in construction to the bracket 12. The thumb screw 21 is employed to lock the bracket 22 in known spaced relation to the bracket 12. The bracket 22 is provided with a pin 16, a yoke 17 and a micrometer 18 organized in the same relation as the similar parts in the bracket 12.

The central portion of the pin 16 is cylindrical, the reduced end portions thereof being mounted in the ears 15 of the brackets and the bores in the yoke 17. A circumferential groove 24 is provided in the pin to receive the pointed end of a set screw 26 threaded into a tapped hole in the yoke. The set screw 26 restrains the pin against longitudinal movement and facilitates rotation thereof with the yoke. A washer 27 is keyed in the threaded end portion 29 of the pin and a tapered thumb nut 31 is screwed against the washer 27 to facilitate the desired resistance to rotation of the yoke assembly about the axis of the pin.

When the instrument is used for bench inspection, as illustrated in Fig. 1, the work piece W may be brought to rest upon a stop plate 33 adjustably mounted on the stanchion 11 through the set screw 34. This set screw is provided with a flat face of larger diameter than the countersunk detent openings 20 to accommodate engagement thereof with the flat 19 without mutilation of the detents. The micrometers are preferably of a type having an adjustment for the zero position of the spindles 36 so that the micrometers may be set to read zero when the spindle engages the pin 16.

In the initial assembly of the instrument, the pin 16 in the bracket 12 is adjusted to lie in the vertical plane of the pin 16 in the bracket 22 when the set screw 21 in the latter is seated in one of the detent openings 20. The set screw 13 in the bracket 12 is then tightened to preserve this adjustment, which may be checked from time to time. The detents are spaced to accommodate simple computation with reference to a table of tapers, for example, the openings may be spaced one inch apart when reference is had to a table determined on given tapers per foot.

In operation, the plate 33 is first adjusted to support the work in such position that the tapered portion of the work piece will lie between the anvils of the micrometers 18 and the pins 15, the bracket 22 being then adjusted to position the set screw 21 in seated engagement within the appropriate detent 20. The tapered portion of the work piece W is inserted through the openings in the yoke 17 and the upper micrometer 18 is brought into engagement with the tapered body while the work is bearing against the pins 16. The micrometer head is then rotated to bring the anvil toward the work, a slight vertical oscillatory movement of the micrometer and yoke being employed during this adjustment to assure the seated relation of the anvil with the work. The final reading of the micrometer is then taken.

The second micrometer is next adjusted in a similar manner. With the two readings thus taken, reference may be had to a table of angles from which the taper per foot may be readily computed, since the intervals between the detents 20 are of a known length. In case wear of the pin 16 occurs, the set screw 26 may be loosened and the pin rotated within the yoke to present an unworn surface in opposition to the micrometer spindle.

Although the foregoing description is necessarily of a detailed character, in order that the invention may be completely set forth, it is to be understood that the specific terminology is not intended to be restrictive or confining, and that various re-arrangement of parts and modifications of detail may be resorted to without departing from the scope or spirit of the invention as herein claimed.

I claim:

1. A measuring device comprising a base, two parts pivoted on the base for rotation about parallel axes, a member mounted on each part for movement substantially perpendicular to the said axes, means for exhibiting the positions of the said members, and means on the base defining an element parallel to each of the said axes and opposed to each of said members, respectively, all constructed and arranged so that a tapered object may be engaged with the said elements and calipered by the said members.

2. A measuring device comprising a base, two parts pivoted on the base for rotation about parallel axes, a member mounted on each part for movement substantially perpendicular to the said axes, means for exhibiting the positions of the said members, and means on the base defining a cylindrical surface concentric with each of the said axes and opposed to the respective members, all constructed and arranged so that a tapered object may be calipered between each member and the corresponding cylindrical surface.

3. A measuring device comprising a base, two parts pivoted on the base for rotation about parallel axes, a member mounted on each part for movement substantially perpendicular to the said axes, means for exhibiting the positions of the said members, and means on the base defining a cylindrical surface concentric with each of the said axes and opposed to the respective members, the last-named means being rotatable about their corresponding axes, all constructed and arranged so that a tapered object may be calipered between each member and the corresponding cylindrical surface.

4. A measuring device comprising a bar, a pair of brackets on the bar, a part pivoted on each bracket for rotation about an axis substantially perpendicular to the bar, means for maintaining the axes parallel each bracket comprising an element parallel to its said axis, a member mounted on each part for movement substantially perpendicular to the said element, and means for exhibiting the positions of the said members, all constructed and arranged so that a tapered object may be calipered between each member and the cylindrical surface of the corresponding bracket.

5. A measuring device comprising a bar, a pair of brackets on the bar, at least one of the brackets being adjustable longitudinally of the bar, a yoke pivoted on each bracket for rotation about an axis substantially perpendicular to the bar, means for maintaining the axes parallel each bracket comprising an element parallel to the said axis, a member mounted on each yoke for movement substantially perpendicular to the said element, and means for exhibiting the positions of the said members, all constructed and arranged so that a tapered object may be calipered between each member and the element of the corresponding bracket.

6. A measuring device comprising a bar, a pair of brackets on the bar, at least one of the brackets being adjustable longitudinally of the bar, a yoke pivoted on each bracket for rotation about an axis substantially perpendicular to the bar, means for maintaining the axes parallel each bracket comprising a cylindrical surface concentric with the said axis, a member mounted on each yoke for movement substantially perpendicular to the said surface, and means for exhibiting the positions of the said members, all constructed and arranged so that a tapered object may be calipered between each member and the cylindrical surface of the corresponding bracket.

7. A measuring device comprising a bar, a pair of brackets on the bar, at least one of the brackets being adjustable longitudinally of the bar, a part pivoted on each bracket for rotation about an axis substantially perpendicular to the bar, means for maintaining the axes parallel each bracket comprising an element parallel to the said axis, a member mounted on each part for movement substantially perpendicular to the said axis, and means for exhibiting the position of the said member, all constructed and arranged so that a tapered object may be calipered between each member and the element of the corresponding bracket, and detent means for locating the brackets on the bar with predetermined spacings between the said axes.

8. A measuring device comprising a bar, a pair of brackets on the bar, a part pivoted on each bracket for rotation about mutually parallel axes substantially perpendicular to the bar, a micrometer, including a spindle, mounted in each part with the axis of the spindle directed perpendicularly to the axis of rotation of the part, and a member on each bracket formed with a surface providing an element parallel to the axis of rotation of the part, all constructed and arranged so that a tapered object may be calipered between each micrometer and the corresponding surface element.

9. A measuring device comprising a bar, a pair of brackets on the bar, a yoke pivoted on each bracket for rotation about mutually parallel axes substantially perpendicular to the bar, a micrometer, including a spindle, mounted in each yoke with the axis of the spindle directed perpendicularly to the axis of rotation of the yoke, and a member on each bracket formed with a cylindrical surface concentric with the axis of rotation of the yoke, all constructed and arranged so that a tapered object may be calipered between each micrometer and the corresponding member.

10. A measuring device comprising a bar, a pair of brackets on the bar, a yoke pivoted on each bracket for rotation about mutually parallel axes substantially perpendicular to the bar, a micrometer, including a spindle, mounted in each yoke with the axis of the spindle directed perpendicularly to the axis of rotation of the yoke, and a member mounted on the bracket formed with a cylindrical surface concentric with the axis of rotation of the yoke and rotatable about the said axis, all constructed and arranged so that a tapered object may be calipered between each micrometer and the corresponding member.

11. A measuring device comprising a bar, a pair of brackets on the bar, at least one of the brackets being adjustable longitudinally of the bar, a yoke pivoted on each bracket for rotation about an axis substantially perpendicular to the bar, means for maintaining the axes parallel a micrometer, including a spindle, mounted in each yoke with the axis of the spindle directed perpendicularly to the axis of rotation of the yoke, and a member on each bracket formed with a cylindrical surface concentric with the axis of rotation of the yoke, all constructed and arranged so that a tapered object may be calipered between each micrometer and the corresponding member.

12. A measuring device comprising a bar, a bracket fixed on the bar, a bracket slidable on the bar, means for fixing the slidable bracket to the bar at predetermined distances from the fixed bracket, a cylindrical rod mounted in each bracket substantially perpendicular to the bar, means for maintaining the rods parallel, a yoke pivoted on each rod, and a micrometer mounted in each yoke, the spindle of the micrometer extending through the yoke into opposition to the rod, all constructed and arranged so that a tapered object may be calipered between each micrometer and the corresponding rod.

13. A measuring device comprising a bar, a bracket fixed on the bar, a bracket slidable on the bar, means for fixing the slidable bracket to the bar at predetermined distances from the fixed bracket, a cylindrical rod mounted in each bracket substantially perpendicular to the bar, the rods being rotatable in the brackets and being maintained parallel by the brackets, a yoke fixed on each rod, a micrometer mounted in each yoke, the spindle of the micrometer extending through the yoke into opposition to the rod, all constructed and arranged so that a tapered object may be calipered between each micrometer and the corresponding rod, and a base for supporting the bar in an upright position.

14. A measuring device comprising a bar, a bracket fixed on the bar, a bracket slidable on the bar, means for fixing the slidable bracket to the bar at predetermined distances from the fixed bracket, a cylindrical rod mounted in each bracket substantially perpendicular to the bar, the rods being maintained in parallel relation by the brackets and being rotatable in the brackets, a yoke fixed on each rod, a micrometer mounted in each yoke, the spindle of the micrometer extending through the yoke into opposition to the rod, all constructed and arranged so that a tapered object may be calipered between each micrometer and the corresponding rod, a base for supporting the bar in an upright position, a stop member slidable on the bar for the object being measured, and means for clamping the stop member to the bar.

15. A measuring device comprising a bar, a bracket fixed on the bar, a bracket slidable on the bar, means for fixing the slidable bracket to the bar at predetermined distances from the fixed bracket, a cylindrical rod mounted in each bracket substantially perpendicular to the bar, the rods being rotatable in the brackets, means for maintaining the rods in mutually parallel relation, a yoke fixed on each rod, means for rotatively adjusting the yoke about the rod, and a micrometer mounted in each yoke, the spindle of the micrometer extending through the yoke into opposition to the rod, all constructed and arranged so that a tapered object may be calipered between each micrometer and the corresponding rod.

16. A measuring device comprising a body, means on the body for defining two parallel axes of rotation and maintaining the axes in parallel relation and at a desired distance from each other, means defining two geometrically cylindrical surfaces the elements of which are parallel to and adjacent to the respective axes, two parts mounted for rotation about the respective axes, and a measuring device on each part movable toward and away from the respective surface, all so constructed and arranged that a tapered article may be disposed between the said devices and surfaces of each set and measured at two points along the article.

17. A measuring device comprising a body, means on the body for defining two parallel axes of rotation and maintaining the axes in parallel relation and at a selected distance from each other, means defining two geometrically cylindrical surfaces the elements of which are parallel to and adjacent to the respective axes, two parts mounted for rotation about the respective axes, and a measuring device on each part movable toward and away from the respective surface, all so constructed and arranged that a tapered article may be disposed between the said devices and surfaces of each set and measured at two points along the article.

18. A measuring device comprising a body, means on the body for defining two parallel axes of rotation and maintaining the axes in parallel relation and at a desired distance from each other, means defining two geometrically cylindrical surfaces the elements of which are parallel to and adjacent to the respective axes, two parts mounted for rotation about the respective axes, and a micrometric screw measuring device on each part including a spindle movable toward and away from the respective surface, all so constructed and arranged that a tapered article may be disposed between the said spindle and surfaces of each set and measured at two points along the article.

19. A measuring device comprising a body, means on the body for defining two parallel axes of rotation and maintaining the axes in parallel relation and at a desired distance from each other, means defining two cylindrical surfaces concentric with the respective axes, two parts mounted for rotation about the respective axes, and a measuring device on each part movable toward and away from the respective surface, all so constructed and arranged that a tapered article may be disposed between the said devices and surfaces of each set and measured at two points along the article.

FRED A. MAXWELL.

REFERENCES CITED

The following references are of record in the file of this patent:

UNITED STATES PATENTS

| Number | Name | Date |
|---|---|---|
| 551,591 | Lake | Dec. 17, 1895 |
| 764,203 | Perkins | July 5, 1904 |
| 869,762 | Woerner | Oct. 29, 1907 |
| 2,400,715 | Sandberg | May 21, 1946 |

FOREIGN PATENTS

| Number | Country | Date |
|---|---|---|
| 390,541 | Germany | Feb. 26, 1924 |
| 483,659 | Germany | Oct. 3, 1929 |